United States Patent

Shirai et al.

[11] Patent Number: 5,925,474
[45] Date of Patent: Jul. 20, 1999

[54] BISMUTH-SUBSTITUTED RARE EARTH IRON GARNET SINGLE CRYSTAL FILM

[75] Inventors: Kazushi Shirai; Norio Takeda, both of Tokyo, Japan

[73] Assignee: Mitsubishi Gas Chemical Company, Inc., Tokyo, Japan

[21] Appl. No.: 08/939,446

[22] Filed: Sep. 29, 1997

[30] Foreign Application Priority Data

Oct. 14, 1996 [JP] Japan ................................. 8-270859

[51] Int. Cl.$^6$ ..................................................... G11B 5/66
[52] U.S. Cl. .................. 428/692; 428/332; 428/694 GT; 428/694 RL; 428/900; 427/128; 427/129; 427/132
[58] Field of Search .......................... 428/692, 694 GT, 428/694 RL, 900, 332; 427/128, 129, 132

[56] References Cited

U.S. PATENT DOCUMENTS

| | | | |
|---|---|---|---|
| 4,454,206 | 6/1984 | Mateika | 428/692 |
| 4,581,579 | 4/1986 | Nagatsuma | 324/244.1 |
| 4,622,264 | 11/1986 | Hosoe | 428/332 |
| 4,698,281 | 10/1987 | Armand | 428/692 |
| 4,932,760 | 6/1990 | Arii | 359/281 |

OTHER PUBLICATIONS

Kano, "Optimized Structure of Sputtered Garnet Disks", IEEE Transactions on Magnetics, vol. 25, No. 5, Sep. 1989.

*Primary Examiner*—Leszek Kiliman
*Attorney, Agent, or Firm*—Sughrue, Mion, Zinn, Macpeak & Seas, PLLC

[57] ABSTRACT

A BIG film for a Faraday rotator is provided with a first antireflection film on the front surface and a second antireflection on the back surface. The first and second antireflection films differ in material or thickness and therefore differ in color. The difference in color makes it possible to visually distinguish the front surface from the back surface. The antireflection films of different colors may be applied to a BIG film with a square hysteresis which retains its magnetic saturation after an external magnetic field has been removed.

7 Claims, No Drawings

BISMUTH-SUBSTITUTED RARE EARTH IRON GARNET SINGLE CRYSTAL FILM

BACKGROUND OF THE INVENTION

The present invention relates to a bismuth-substituted rare earth iron garnet single crystal used as a Faraday rotator in optical circulators and optical isolators, and more particularly to a bismuth-substituted rare earth iron garnet single crystal film whose front and back surfaces are distinguished by the colors of the antireflection films formed thereon.

DESCRIPTION OF RELATED ART

Recently, optical fiber communications and optical instrumentation have made remarkable progress. Semiconductor lasers are widely used as a signal source in the optical fiber communications and optical instrumentation. However, semiconductor lasers are disadvantageous in that oscillation becomes unstable due to so-called reflected light return where light is reflected by, for example, the end of the optical fiber back to the semiconductor laser. In order to solve this drawback, an optical isolator is provided on the light-exiting surface of the semiconductor laser, blocking the reflected light return to stabilize oscillation.

An optical isolator is constructed of a polarizer, analyzer, Faraday rotator, and permanent magnet for magnetically saturating the Faraday rotator. The Faraday rotator that performs a chief function in the optical isolator is made of, for example, $(HoTbBi)_3Fe_5O_{12}$ and $(LuTbBi)_3(FeAl)_5O_{12}$. These bismuth-substituted rare earth iron garnet single crystals have thicknesses ranging from several tens $\mu$m to 400 $\mu$m and are usually grown by the liquid phase epitaxial method.

Recently, bismuth-substituted iron garnet single crystal films such as $(TbBi)_3(FeAlGa)_5O_{12}$ (U.S. patent application Ser. No. 08/867,497 now pending) have been developed which have very large magnetic hysteresis. This kind of materials make it possible to manufacture an optical isolator without having to use a permanent magnet. The elimination of a permanent magnet will provide miniaturized optical isolators at lower costs.

With conventional isolators using a permanent magnet, the polarity of a permanent magnet attached to a bismuth-substituted rare earth iron garnet single crystal (referred to as BIG hereinafter) determines the direction in which the BIG film is magnetized. Therefore, the permanent magnet can be mounted on either surface of the BIG film. However, when manufacturing an optical isolator using a BIG film that does not need a permanent magnet, the optical isolator must be assembled by property orienting the permanently magnetized BIG film. In other words, the BIG film must have some indication so that the worker can distinguish between the front surface and back surface of the BIG film.

In the manufacture of optical isolators using a BIG film that does not need a permanent magnet, the BIG film is first magnetically saturated using a powerful magnetizing apparatus such as an electromagnet. The BIG film is subsequently taken out of the magnetizing apparatus and assembled into an optical isolator. The BIG film subsequently often undergoes cleaning operation and cutting operation before it is assembled into an isolator. However, it is very difficult to handle the BIG film with the front surface of the BIG film distinguished from the back surface during the cleaning and cutting operations. Once an error occurs in determining the magnetization direction, the pieces of BIG film must be magnetized all over again or the polarization direction of the light transmitted through the BIG film must be measured to distinguish between the front surface and back surface of the BIG film.

Therefore, if the pieces of BIG film look all the same, they should be shaped or oriented so that the magnetization direction can be easily recognized by inspection before they are assembled into optical isolators.

SUMMARY OF THE INVENTION

An object of the invention is to provide a visible indication of the direction of saturated magnetization of a bismuth-substituted iron garnet single crystal film having a square hysteresis.

A BIG film for a Faraday rotator is provided with a first antireflection film on the front surface and a second antireflection film on the back surface. The first and second antireflection films differ in material and/or thickness and therefore differ in color. The difference in color makes it possible to visually distinguish the front surface from the back surface after the single crystal film has been magnetically saturated in a predetermined direction. The present invention is advantageously applied to the manufacture of a BIG film with a square hysteresis.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The inventors put significant efforts in solving the aforementioned technical problem.

A BIG film blocks visible light almost completely and therefore is black. Usually, the BIG film used in Faraday rotators for optical isolators has an antireflection film formed on its surface so as to increase transmittance of light. When an antireflection film for a 1.31 $\mu$m range or a 1.55 $\mu$m range is formed on the BIG film, the BIG film shows various shades of color from red to blue depending on the compositions, combinations of the compositions, and thicknesses of the antireflection film.

In other words, the antireflection films intended for use in the 1.31 $\mu$m range and the 1.55 $\mu$m range, which are most commonly used wavelengths in the optical communications, show different patterns of completely different values of transmittance and reflective index at wavelengths ranging from 400 to 800 nm depending on the materials and thicknesses of the antireflection film. Thus, these antireflection films show different shades of color on their surfaces. Therefore, the front and back surfaces of a BIG film can easily be distinguished by their surface colors even if different antireflection films having the same function are formed on the front and back surfaces of the BIG film.

That is, the present invention relates to a BIG film used for a Faraday rotator where antireflection films for wavelengths longer than 1 $\mu$m are formed on the front and back surfaces of the BIG film. Thus, the BIG film according to the present invention has a feature that the front and back surfaces show different colors. The present invention is advantageously applied to the manufacture of a BIG film with a square hysteresis.

The present invention will now be described in detail. The media or materials that constitute an antireflection film of the invention are selected taking the refractive index and desired reflective index of the BIG film into account. The materials include $SiO_2$, $MgF_2$, $Al_2O_3$, $Ta_2O_5$, $ZrO_2$, $TiO_2$, $Nd_2O_3$, and $Y_2O_3$. These materials are used either alone or in combinations depending on the refractive index or the desired reflective index of the BIG film on which the antireflection film is formed.

BIG films that are heavily doped with bismuth have refractive indices in the range from 2.3 to 2.4 in the near infrared range from 0.8 to 1.6 $\mu$m. Therefore, the antireflection film is a single layer of $Al_2O_3$, three-layer construction of $SiO_2$, $Al_2O_3$, and $SiO_2$ in order from the atmosphere, three-layer of $SiO_2$, $Ta_2O_5$, and $SiO_2$ in order from the atmosphere, or two-layer construction of $SiO_2$ and $ZrO_2$ in order from the atmosphere. The antireflection film is formed on the BIG film preferably by the vacuum deposition, ion assisted deposition, ion plating, or sputtering.

There is no particular requirement on the compositions of a BIG for a Faraday rotator according to the present invention, but the bismuth-substituted iron garnet is preferably given by a general formula: $R_{3-x}Bi_xFe_{5-z}A_zO_{12}$ where R is at least one element selected from a group of Y, La, Ce, Pr, Nd, Sm, Eu, Cd, Tb, Dy, Ho, Er, Tm, Yb, and Lu, A is at least one element selected from a group of Ga, Sc, Al, and In, and X has the range $0.3 \leq X \leq 2.0$ and $0 \leq Z \leq 1.5$.

While a bismuth-substituted iron garnet single crystal may be manufactured by any conventional method, the LPE method is preferred since the LPE method allows the single crystal to be handled without difficulties during manufacture and lends itself to mass production.

The present invention is preferably applied to a bismuth-substituted iron garnet single crystal having large hysteresis. Once such a single crystal is magnetized by an external magnetic field, it retains its magnetic saturation after the external magnetic field has been removed.

The present invention is preferably applied to the manufacture of a Faraday rotator having a square hysteresis, the front and back surfaces of the Faraday rotator being distinguished by the colors of antireflection films formed thereon.

The BIG film is grown by the LPE method on a substrate having a diameter larger than 2 to 3 inches. The BIG film is then cut into a predetermined size of about 10 mm square. The front and back surfaces of the BIG film are polished, and an antireflection film is formed on each surface. The BIG film is further cut into a practical size (1 to 2 mm in diameter) for final products.

In the manufacture of a Faraday rotator having a square hysteresis, the magnetizing operation of the BIG film may be performed immediately after the antireflection film has been formed on the BIG film or shortly after the BIG film is cut into final products. The magnetization operation is preferably performed after the antireflection is formed since the magnetization operation is rather cumbersome once the BIG film has been cut into final products.

After the magnetization operation, the BIG film is sent to the subsequent manufacturing processes such as cutting into final sizes, examination, packaging, and assembling into an isolator. The magnetization direction of the BIG film is easily distinguished by colors, the different shades of color on the front and back surfaces preventing the worker from making mistakes when distinguishing the front and back surfaces of the BIG film throughout the subsequent manufacturing processes. The different colors on the surfaces of the BIG film also facilitate to handle after shipping the BIG film.

The present invention will now be described by way of examples and comparisons.

EXAMPLE 1

The following materials were introduced in a platinum crucible of 2,000 ml capacity: 3,733 gm lead oxide (PbO, 4N), 3,542 gm bismuth oxide ($Bi_2O_3$, 4N), 459 gm ferric oxide ($Fe_2O_3$, 4N), 166 gm boron oxide ($B_2O_3$, 5N), 4.5.9 gm terbium oxide ($Tb_2O_3$, 3N), and 53.9 gm gallium oxide ($Ga_2O_3$, 3N). The crucible was placed in the center of the electric furnace and was heated to 1,000° C. to melt the materials together. The heated materials were blended well to prepare a homogeneous melt for growing a BIG.

A 3-inch diameter substrate was placed in position with its one surface in contact with the surface of the homogeneous melt, so that a $Bi_{1.2}Tb_{1.8}Fe_{4.3}Ga_{0.7}O_{12}$ single crystal film (referred to as G-film-1 hereinafter) having a thickness of 462 $\mu$m was epitaxially grown by the usual method. This substrate was (111) garnet single crystal 1.2497±0.0002 nm and a thickness of 500 $\mu$m.

The G-film-1 was cut into a predetermined size of 10.5 mm square, yielding 25 basic sheets of film. The front and back surfaces of the basic sheets of film were polished to a thickness of 386 $\mu$m and mirror-like surfaces, yielding 25 C-film-1 (referred to as BASIC-1 hereinafter). The substrate was removed during the polishing operation.

Of the 25 BASIC-1, 5 sheets were selected and a three-layer antireflection film was formed on a first surface of the BASIC-1 by ion assisted deposition, depositing a first layer of about 104-nm thick $SiO_2$ directly on the crystal surface, then a second layer of about 55-nm thick $Al_2O_3$, and finally a third layer of about 104-nm thick $SiO_2$.

Then, a three-layer antireflection film was formed on a second surface of the BASIC-1 opposing the first surface by ion assisted deposition, depositing a first layer of about 44-nm thick $SiO_2$ directly on the crystal surface, then a second layer of about 88-nm thick $Al_2O_3$, and finally a third layer of about 138-nm thick $SiO_2$.

The resulting reflectance (reflectivity) was 0.38% at a wavelength of 1,550 nm on the both surfaces. This reflective index was sufficiently low for a Faraday rotator. This single crystal film having an antireflection film deposited thereon is referred to as BASIC-2-1 hereinafter.

The 5 sheets of BASIC-2-1 were light purple on one surface thereof and bluish purple on the other surface.

An arbitrary sheet of the 25 sheets of BASIC-2-1 was selected. The light purple surface was assumed as a front surface and bluish purple surface as a back surface. The BASIC-2-1 was placed in the middle of an electromagnet and a magnetic field of 5,000 Oe was applied to magnetically saturate the BASIC-2-1. The magnetic field was applied in the direction from the front surface to the back surface.

Thereafter, the magnetically saturated BASIC-2-1 was attached to a piece of tape and cut into a size of 1.5 mm square, yielding 36 chips. The 36 chips were separated from the tape. Each chip was loaded to a measurement holder arid subjected to optical measurements (insertion loss, Faraday rotation, extinction ratio) and examination under an infrared microscope for internal defects. Three chips were found to be defective.

Then, the remaining 33 chips were subjected to surface examination (chipping, polish scratches, scratches and dislocation of reflection film) under a metallographical microscope. Two chips were found to be defective.

Optical isolators were assembled using the remaining 31 chips that passed the aforementioned examinations. During the assembly, the direction of magnetization was distinguished by the colors of the front and back surfaces and the chips were placed in the optical isolators with the front surface facing the polarizer and the back surface facing the analyzer. All the optical isolators functioned satisfactorily.

EXAMPLE 2

Five BASIC-2-1 were selected. A three-layer antireflection film was formed on each surface of BASIC-2-1 by the ion assisted deposition, depositing a first layer of about 104-nm thick $SiO_2$ directly on the surface of BASIC-2-1, then a second layer of about 55-nm thick $Ta_2O_3$, and finally a third layer of about 104-nm thick $SiO_2$.

Then, a three-layer antireflection film was formed on a second surface of the BASIC-1 by the ion assisted deposition, depositing a first layer of about 110-nm thick $SiO_2$ directly on the crystal surface, then a second layer of about 27-nm thick $Ta_2O_5$, and finally a third layer of about 110-nm thick $SiO_2$.

The resulting reflectance was 0.47% on the both surfaces at a wavelength of 1,550 nm. This reflective index was sufficiently low for a Faraday rotator. This BASIC-2-1 having antireflection films deposited thereon is referred to as BASIC-2-2 hereinafter.

BASIC-2-2 were light purple on the front surface thereof and reddish purple on the back surface.

Comparison 1

Five BASIC-2-1 were selected. A three-layer antireflection film was formed on the front surface and back surface of each BASIC-2-1 by the ion assisted deposition, depositing a first Layer of about 104-nm thick $SiO_2$ directly on the surface of BASIC-2, then a second layer of about 55-nm thick $Al_2O_3$, and finally a third layer of about 104-nm thick $SiO_2$.

This BASIC-2-1 which has the three-layer antireflection film formed thereon is referred to as BASIC-2-C.

The resulting reflectance was 0.23% at a wavelength of 1,550 nm on both surfaces. This reflective index was sufficiently low for a Faraday rotator. The colors on the both surfaces were substantially the same.

One of five BASIC-2-C was selected and placed in the middle of an electromagnet. Then, BASIC-2-C was magnetically saturated in a magnetic field of 5,000 Oe.

Thereafter, the magnetized BASIC-2-C was attached to a piece of tape and cut into a size of 1.5 mm square, yielding 36 chips. Then, the 36 chips were separated from the tape. Each chip was loaded to a measurement holder and subjected to optical measurements (insertion loss, Faraday rotation, extinction ratio) and examination under an infrared microscope for internal defects. Four chips mere found to be defective.

Then, the remaining 32 chips were subjected to surface examination under a metallographical microscope for chipping, polish scratches, scratches and dislocation of the antireflection film. Three chips were found to be defective.

Optical isolators were assembled using 29 chips that passed the aforementioned examinations. Three isolators were found to be unsatisfactory as an isolator but were found to function sufficiently after the orientation of BASIC-2-C was reversed. This indicates that the three isolators had been assembled with the BASIC-2-C erroneously oriented since the front and back surfaces were substantially the same color and could not be visually distinguished.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bismuth-substituted rare earth iron garnet single crystal film for a Faraday rotator, the single crystal film having front and back surfaces on which antireflection films are formed, the antireflection film reflecting light having a wavelength longer than 1 μm, the single crystal film comprising:

a first antireflection film of a first color, said first antireflection film being formed on a front surface of the bismuth-substituted rare earth iron garnet single crystal film; and a second antireflection film of a second color, said second antireflection film being formed on a back surface of the bismuth-substituted rare earth iron garnet single crystal film.

2. The bismuth-substituted rare earth iron garnet single crystal film of claim 1, wherein the bismuth-substituted rare earth iron garnet single crystal film has a square hysteresis of magnetization.

3. The bismuth-substituted rare earth iron garnet single crystal film of claim 1, wherein each of said first and second antireflection films is of a three-layer construction with adjacent layers formed of different materials.

4. The bismuth-substituted rare earth iron garnet single crystal film of claim 1, wherein said first and second antireflection films differ in thickness.

5. A method of manufacturing a bismuth-substituted rare earth iron garnet single crystal film having a square hysteresis, the single crystal film having front and back surfaces on which antireflection films are formed, the antireflection film reflecting light having a wavelength longer than 1 μm, the front and back surfaces being visually distinguished from each other, the method comprising the steps of:

growing a bismuth-substituted rare earth iron garnet single crystal film having a square hysteresis by an LPE method;

cutting the bismuth-substituted rare earth iron garnet single crystal film into a predetermined basic size;

polishing the front and back surfaces of the bismuth-substituted rare earth iron garnet single crystal film of the predetermined basic size;

forming, after polishing the first and second surfaces, a first antireflection film on the front surface and a second antireflection film on the back surface, the first and second antireflection films having different colors and reflecting light of wavelengths longer than 1 μm; and magnetizing the bismuth-substituted rare earth iron garnet single crystal film with the front and back surfaces oriented in a predetermined direction with respect to a magnetic field, the front and back surfaces being distinguished by the colors.

6. The method of claim 5, wherein each of said first and second antireflection films is of a three-layer construction with adjacent layers formed of different materials.

7. The method of claim 5, wherein said first and second antireflection films differ in thickness.

* * * * *